United States Patent
Ohno

(10) Patent No.: US 7,463,389 B2
(45) Date of Patent: Dec. 9, 2008

(54) IMAGE PROCESSING METHOD, IMAGE PROCESSING DEVICE AND PROGRAM

(75) Inventor: Hajime Ohno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 716 days.

(21) Appl. No.: 11/005,184

(22) Filed: Dec. 6, 2004

(65) Prior Publication Data

US 2005/0190411 A1   Sep. 1, 2005

(30) Foreign Application Priority Data

Dec. 10, 2003   (JP)   ............................. 2003-412337
Oct. 13, 2004   (JP)   ............................. 2004-298471

(51) Int. Cl.
*G06K 15/00*   (2006.01)

(52) U.S. Cl. ...................... 358/3.28; 358/1.9; 358/453; 358/464; 382/173; 382/282; 382/298; 382/299

(58) Field of Classification Search .................. 358/1.9, 358/100, 3.28, 1.14, 451, 453, 462, 464; 382/232, 291–295, 173, 282, 298, 299; 380/54, 380/210, 287; 283/113, 902, 93; 713/176
See application file for complete search history.

(56) References Cited

U.S. PATENT DOCUMENTS

| | | | |
|---|---|---|---|
| 5,363,212 A * | 11/1994 | Taniuchi et al. | ............. 358/452 |
| 5,788,285 A | 8/1998 | Wicker | |
| 6,000,728 A | 12/1999 | Mowry, Jr. | |
| 6,424,725 B1 * | 7/2002 | Rhoads et al. | ............... 382/100 |
| 6,507,677 B2 * | 1/2003 | Miura et al. | ................. 382/299 |
| 7,095,873 B2 * | 8/2006 | Venkatesan et al. | ......... 382/100 |
| 7,266,216 B2 * | 9/2007 | Braudaway et al. | ......... 382/100 |
| 2001/0030761 A1 * | 10/2001 | Ideyama | ..................... 358/1.9 |
| 2002/0114013 A1 * | 8/2002 | Hyakutake et al. | ......... 358/3.28 |
| 2006/0204032 A1 * | 9/2006 | Nakamura et al. | .......... 382/100 |

FOREIGN PATENT DOCUMENTS

| | | |
|---|---|---|
| JP | 02-130164 A | 5/1990 |
| JP | 2001-197297 A1 | 1/2001 |
| JP | 2001-238075 A1 | 8/2001 |
| JP | 2001-324898 A | 11/2001 |
| JP | 2002-023572 A | 1/2002 |

* cited by examiner

*Primary Examiner*—Twyler L Haskins
*Assistant Examiner*—Dennis Dicker
(74) *Attorney, Agent, or Firm*—Canon U.S.A. Inc., I.P. Division

(57) ABSTRACT

A copy-forgery-inhibited pattern image can be enlarged or reduced. More specifically, the shapes of a latent image portion and a background portion are changed according to a certain magnification factor, and a pattern appropriate for the copy-forgery-inhibited pattern image is applied to a dot pattern making up the latent image portion and a background portion. Thus, the appropriate copy-forgery-inhibited pattern image according to the size of a document image after change can be generated without deteriorating the function of the copy-forgery-inhibited pattern image, and the copy-forgery-inhibited pattern image can be overlaid with the document image and output.

11 Claims, 14 Drawing Sheets

FIG. 3A
| 6 | 7 | 8 | 9 |
|---|---|---|---|
| 5 | 0 | 1 | 10 |
| 4 | 3 | 2 | 11 |
| 15 | 14 | 13 | 12 |
FIG. 3B
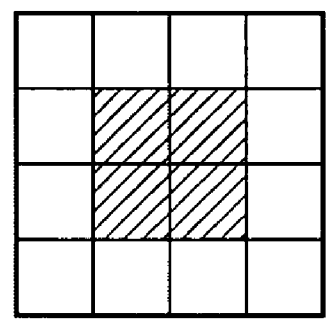
FIG. 3C
| 0 | 8 | 2 | 10 |
|---|---|---|---|
| 12 | 4 | 14 | 6 |
| 3 | 11 | 1 | 9 |
| 15 | 7 | 13 | 5 |
FIG. 3D
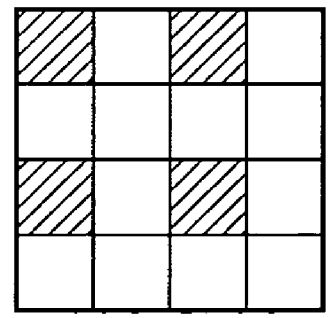

FIG. 4

| LATENT IMAGE PORTION | BACKGROUND PORTION |
|---|---|
| X_L, Y_L | X_S, Y_S |
| T_L=N_L/(X_L*Y_L) | T_S=N_S/(X_S*Y_S) |

MAGNIFICATION 1

ENLARGED

REDUCED

FIG. 11

INVOICE (Page 1/1)

AAA & Associates, AIA
28 Xxxxx, Suite 2106, Yyyyy, ZZ 60631
Tel: (xxx) xxx-xxxx Fax: (xxx) xxx-xxxx Invoice Number    1033803
Invoice Date    Jul 1, 2004

Ms. Abcde Fgi
PPPP Design, Inc
222 Mmm Ave Nnnn, QQ 94482

| Project ID | Phase Description | Amount Due |
|---|---|---|
| 04-400:1 | Existing Conditions Phase | $4,200.00 |
| 04-400:2 | Schematic Development | $11,700.00 |
| 04-400:3 | Construction Documents | $18,200.00 |
| 04-400:4 | Bidding & Award | $4,920.00 |
| 04-400:5 | As-Builts 20 | $800.00 |
| 04-400:6 | Construction Administration | $2,000.00 |

Total Amount Due    $41,190.00

IMAGE PROCESSING METHOD, IMAGE PROCESSING DEVICE AND PROGRAM

BACKGROUND OF THE INVENTION

1. Field of the Invention

The present invention relates to an image processing method, an image processing device and a program, and more particularly, relates to anti-counterfeit printing technology using a copy-forgery-inhibited image for deterring use of reproductions and the like.

2. Description of the Related Art

Hitherto, in order to prohibit or deter copying of documents (hereinafter, also referred to as "contents") requiring originality thereof such as ledger sheets and certificates, these contents have been printed onto sheets subjected to special printing, called anti-counterfeit sheets. The anti-counterfeit sheets are sheets in which the original printing cannot be viewed clearly by the human eye, but a predetermined text or drawing, such as "VOID", is manifested thereupon in the case of copying these sheets using a copier. The anti-counterfeit sheets have had problems such as the anti-counterfeit sheets needing to be subjected to special printing beforehand, resulting in an increase in cost compared to ordinary sheets, and also that only the text or drawing set at the time of manufacturing the anti-counterfeit sheets can be manifested. Techniques regarding manufacture of such anti-counterfeit sheets are disclosed in U.S. Pat. No. 5,788,285 by Wicker and U.S. Pat. No. 6,000,728 by Mowry et al.

On the other hand, while digitization of various contents have advanced, the contents requiring the originality thereof, such as ledger sheets and certificates have also been digitized. However, digitization regarding contents such as ledger sheets and certificates is still in a transitional state, and accordingly contents created by a computer are commonly output onto sheets using a printer or the like.

In addition to such a situation, techniques for fabricating sheets having the same effects as the conventional anti-counterfeit sheets using a computer and a printer have drawn considerable attention due to rapid improvement of printer performance in recent years. Techniques for overlaying contents created by using a computer with a copy-forgery-inhibited pattern image and outputting these onto sheets using a printer are disclosed in Japanese Patent Laid-Open No. 2001-197297 and Japanese Patent Laid-Open No. 2001-238075.

Though a copy-forgery-inhibited pattern image looks like a simple texture having no meaning in the original printed matter output using a printer, upon the original printed matter being copied, a predetermined text or drawing emerges over the copied matter. Thus, there is the same deterring effect for anyone attempting to copy such sheets, as with anti-counterfeit sheets.

In the event that a contents image and a copy-forgery-inhibited pattern image are overlaid and output onto sheets using a computer, normal ordinary sheets can be used for output, resulting in an advantage of cost reduction compared to the conventional anti-counterfeit sheets. Furthermore, in addition to a predetermined static text such as "VOID", another advantage can be provided in that optional and dynamic text such as a user name, output date and time can be embedded in output sheets.

Technically speaking, copy-forgery-inhibited pattern images take advantage of the fact that the printing resolution of a printer (output device) is higher than the readable resolution of an image scanner (reading device), and a region to be detected by an image scanner and a region not to be detected by the image scanner are provided in a copy-forgery-inhibited pattern image by adjusting the dot size making up the image and the area density of a predetermined region. Subsequently, the density difference between the two regions is minimized at the stage of printed matter, and the density difference between the two regions is maximized at the stage of copied matter. In other words, while a copy-forgery-inhibited pattern image looks like a uniform texture or a simple background as viewed from human eyes since the area density difference between the two regions is minimal at the stage of printed matter, the area density difference between the two regions increases at the stage of copied matter obtained by copying the printed matter, and consequently, one region (region to be detected by the image scanner) emerges as an image that can be clearly recognized by human eyes relative to the other region.

For example, with a copy-forgery-inhibited pattern image to be printed, the image included in the region to be detected by the image scanner is made up of large dots (concentrated dots), and the image included in the region not to be detected by the image scanner is made up of isolated small dots (dispersed dots). Note that area density in the region to be detected by the image scanner is set to equal to or generally equal to that in the region not to be detected by the image scanner.

Upon the copy-forgery-inhibited pattern image thus printed being read by the image scanner and copied, while the large dots are detected by the image scanner and accordingly reproduced in copied matter, the small dots are not detected by the image scanner and accordingly mostly not reproduced in the copied matter (or only a part of the small dot is reproduced). Thus, with the copied matter, the region image made up of the small dots disappears, or the area density becomes lower than prior to copying (faded so as to become close to white). On the other hand, the region image made up of the large dots is formed as with normal scanning, and accordingly, the contrast between the two region images becomes clear.

Note that for the sake of explanation, in the following description according to the present specification, an image in a copy-forgery-inhibited pattern, of which the dots are reproduced at the time of copying, to be formed on copied matter following copying will be referred to as "latent image", on the other hand, an image in a copy-forgery-inhibited pattern, of which dots are not reproduced at the time of copying, to disappear entirely following copying, or of which density becomes low, will be referred to as "background image".

Also, as for a copy-forgery-inhibited pattern, a technique referred to as "camouflage" for further preventing a hidden text or image (latent image) from recognition is well known. This camouflage technique is a method for disposing a pattern of which area density is different from that in a latent image portion and background portion in a copy-forgery-inhibited pattern image on the entire copy-forgery-inhibited pattern image, and an advantage is provided wherein the camouflage pattern of which area density is different from that in the latent image portion and background portion becomes marked, the latent image becomes even more inconspicuous. Also, an advantage is obtained wherein a copy-forgery-inhibited pattern including a camouflage pattern gives a decorative impression compared to a copy-forgery-inhibited pattern image without a camouflage pattern.

The inner dots of this camouflage pattern should disappear as much as possible following copying so as to facilitate easy recognition of the latent image following copying. In the case of a simplest configuration, camouflage can be realized by preventing dots from printing at positions corresponding to the camouflage pattern.

Also heretofore, when outputting a contents image created by using a computer on a printer, printing with the layout of the contents and the output size thereof being modified can be performed. Also, a configuration wherein printed matter is generated such that contents and a copy-forgery-inhibited pattern image are not overlapped is disclosed in Japanese Patent Laid-Open No. 11-245473.

As described above, in the event of overlaying contents created by using a computer with a copy-forgery-inhibited pattern image, and outputting this, it is most important to appropriately control the size of dots to be printed, and control readability of an image scanner in a sure manner.

However, in the event that a copy-forgery-inhibited pattern image is enlarged/reduced along with the contents image, and printed in accordance with a commonly known page layout function, or enlarging/reducing processing, the contrast between the latent image and the background image increases at the time of printing, resulting in a state in which a latent image such as "VOID" that should not appear in printed matter can be recognized in some cases. Also, in some cases, a latent image may not be manifested correctly in copied matter following copying. That is to say, when a contents image to be printed is changed in size according to a change of layout and so forth, the copy-forgery-inhibited pattern image being changed in size in the same way causes the copy-forgery-inhibited pattern image to become inappropriate, and accordingly, the function thereof as a copy-forgery-inhibited pattern is sometimes lost.

For example, let us say that contents data created by using a computer is overlaid with a copy-forgery-inhibited pattern image made up of a text (latent image) of "VOID" formed with a dot pattern in a size that can be read by the image scanner of a copier, and the other portion (background) made with a dot pattern that cannot be read by the image scanner of the copier, and printed.

In the event that contents data is not changed in size, the copy-forgery-inhibited pattern image is not changed in size either. Accordingly, in this case, with printed matter just printed, an observer cannot recognize the text "VOID" in the copy-forgery-inhibited pattern image, and the observer recognizes the copy-forgery-inhibited pattern image as a simple texture or background. Upon this printed matter being copied using the copier, only the text "VOID" serving as the latent image of the copy-forgery-inhibited pattern image is manifested.

On the other hand, in the event that contents data is reduced in size and printed, the copy-forgery-inhibited pattern image is also simply reduced in size as well as the contents. Accordingly, in this case, with the copy-forgery-inhibited pattern image, the text "VOID" formed with a dot pattern in a size that can be read by the image scanner of the copier is also reduced. In other words, the number of dots per unit region is changed, or the dots themselves are reduced, due to interpolation using enlargement/reduction. Accordingly, in the event that this printed matter is copied using the copier, the image scanner cannot detect the dots of the text "VOID", and consequently, the obtained copied matter becomes incomplete such as a case wherein the text "VOID" is dropped out from the obtained copied matter.

Also, in the event that contents data is enlarged in size and printed, a copy-forgery-inhibited pattern image is also simply enlarged in size as well as the contents. Accordingly, in this case, with the copy-forgery-inhibited pattern image, the pattern dots of the portion other than the text "VOID" formed with a dot pattern in a size that cannot be read by the image scanner of the copier is also enlarged (the number of dots per unit region is changed, or a dot itself is enlarged, due to interpolation using enlargement/reduction). Accordingly, in the event that this printed matter is copied using the copier, the image scanner detects the dots of the portion other than "VOID", and consequently, the text "VOID" cannot be manifested on the obtained copied matter in some cases.

Furthermore, the dots making up the text "VOID" formed with a dot pattern in a size that can be read by the image scanner of the copier are also enlarged and printed in the copy-forgery-inhibited pattern image, and accordingly, the balance of area density is lost, the text "VOID" can be recognized on printed matter just printed in some cases. In this case, there is the possibility that the printed matter may be determined to be copied matter, which is incomplete as for output including a copy-forgery-inhibited pattern image.

In order to avoid such a problem, in general, even if a change of the layout or enlargement/reduction regarding contents data is specified, the enlargement or reduction of a copy-forgery-inhibited pattern image is not performed.

However, there are cases in which an operator, who intends to generate contents data to which a copy-forgery-inhibited pattern image is added, lays out the copy-forgery-inhibited pattern image according to the content of contents data and an object in some cases. For example, in the event that there is a region including a photo or logo in contents data that the operator does not intend to overlay with a copy-forgery-inhibited pattern image, the operator designs the copy-forgery-inhibited pattern image such that the copy-forgery-inhibited pattern image is not applied to that region. Also, as illustrated in FIG. 10, positions to be disposed are sometimes regulated according to the positional relation between the latent image of a copy-forgery-inhibited pattern image and a contents image.

In such a case, if an arrangement is made wherein change of the layout or enlargement/reduction regarding a contents image is performed, and also a copy-forgery-inhibited pattern image does not follow such processing, a problem occurs in which a desired output cannot be obtained. For example, as illustrated in FIG. 9, the latent image of the copy-forgery-inhibited pattern image is regulated at a specific position as to the contents image, however, if only the contents image is reduced, output is performed such as shown in FIG. 10, and this is different from the desired output.

On the other hand, if only the contents image is enlarged, output is performed such as shown in FIG. 11.

SUMMARY OF THE INVENTION

The present invention has been made in light of the above-described problems. The present invention generates appropriate background images even in the event that change of the layout or enlargement/reduction regarding contents data occurs.

According to a first aspect of the present invention, an image processing method, having an image formation process for forming a copy-forgery-inhibited pattern image made up of at least two regions including a first region wherein an image is formed on a reproduction following copying formed of a first dot pattern, and a second region wherein an image is not formed following copying or an image having lower density than that in the first region is formed of a second dot pattern, comprises: obtaining a magnification factor of the copy-forgery-inhibited pattern image; changing sizes of the first region and the second region in accordance with the magnification factor obtained; and forming the first region enlarged/reduced in the enlarging/reducing process using the first dot pattern and forming the second region enlarged/reduced in the enlarging/reducing process using the second dot pattern.

The image processing method may further comprise: dividing the copy-forgery-inhibited pattern image into a plurality of divided regions; detecting a dot pattern for each divided region; and acquiring boundary shapes of the first region and the second region based on detection results of the dot pattern. The enlarging/reducing process changes the boundary shapes of the first region acquired and the second region acquired using the magnification factor.

A reference point may be acquired with the magnification factor. Also, the magnification factor of the copy-forgery-inhibited pattern image may be a magnification factor for a contents image to be combined with the copy-forgery-inhibited pattern image.

The image processing method may further comprise an input process for inputting setting information regarding whether or not the copy-forgery-inhibited pattern image is enlarged/reduced with the contents image. The enlarging/reducing of the copy-forgery-inhibited pattern image is performed based on the setting information input in the input process.

According to another aspect of the present invention, a program is provided for executing on an information processing device an image processing method according to the method described above.

According to another aspect of the present invention, an image processing device, having an image formation unit for forming a copy-forgery-inhibited pattern image made up of at least two regions including a first region wherein an image is formed on a reproduction following copying formed of a first dot pattern, and a second region wherein an image is not formed following copying or an image having lower density than that in the first region is formed of a second dot pattern, comprises: a magnification factor acquisition unit for obtaining a magnification factor of the copy-forgery-inhibited pattern image; an enlarging/reducing unit for changing sizes of the first region and the second region in accordance with the magnification factor obtained by the magnification factor acquisition unit; and a dot formation unit for forming the first region enlarged/reduced by the enlarging/reducing unit using the first dot pattern and forming the second region enlarged/reduced by the enlarging/reducing unit using the second dot pattern.

According to the present invention, when a copy-forgery-inhibited pattern image is subjected to enlargement or reduction processing, only the regions of each element making up a copy-forgery-inhibited pattern image are changed according to a predetermined magnification factor without changing the dot pattern forming the shapes and the inner portions of the aforementioned elements. An appropriate copy-forgery-inhibited pattern image according to the size of a document image after change can be generated without deteriorating the function of a copy-forgery-inhibited pattern, and the copy-forgery-inhibited pattern image can be overlaid with the document image and output.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram illustrating an example of a dither matrix.

FIG. 4 is a diagram for comparing the area ratios of black pixels of a latent image portion and a background portion.

FIG. 11 is a diagram illustrating an example of printed matter with a copy-forgery-inhibited pattern in the event of enlarging only a contents image.

DESCRIPTION OF THE EMBODIMENTS

Figure 1:
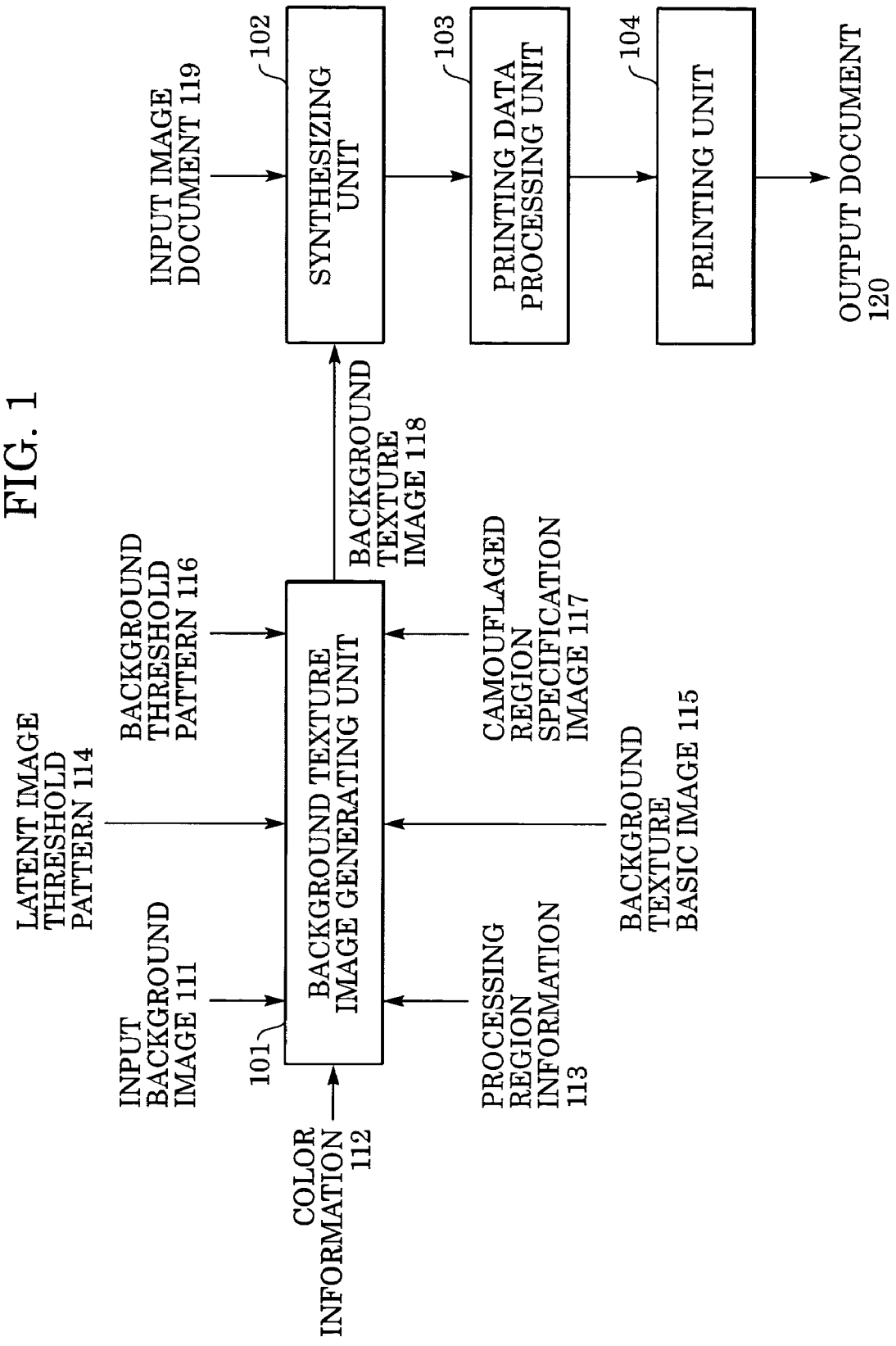
FIG. 1 is a block diagram illustrating an exemplary configuration of an image processing device according to a first embodiment of the present invention.

Description will be made below regarding exemplary embodiments for implementing the present invention with reference to the drawings. Note that with the exemplary embodiments, an image corresponding to a background portion is designed such that dots are disposed in a dispersed manner using a dot-dispersed dither matrix, and an image corresponding to a latent image is designed such that dots are disposed in a concentrated manner, using a dot-concentration dither matrix.

Also, a background portion is described as a "region to disappear" at the time of copying for the sake of description of the present invention, but the present invention is not restricted to this; an arrangement may be made wherein when copying printed matter on which a copy-forgery-inhibited pattern image is formed using a copier, a human can recognize that the obtained copied matter is not the printed matter on which a copy-forgery-inhibited pattern image is formed through a manifested latent image portion, i.e., an image in the background portion is printed in a fading manner as to the latent image portion. Accordingly, the image in the background portion does not need to disappear on copied matter, as long as a density level is a level enabling the latent image to be recognized.

Hereinafter, a dither matrix used for generating an image in a background portion is referred to as "background dither matrix", and a dither matrix used for generating an image in a latent image portion is referred to as "latent dither matrix".

The dither method is a method for comparing a multi-valued input image signal with a threshold calculated in accordance with a certain rule, and outputting a binary image depending on the magnitude relation thereof. A dither matrix is a threshold matrix in which a threshold at the time of subjecting an input image signal to binarizing by dithering is disposed in a two-dimensional manner.

The pixel value of an input image signal is subjected to binarization with the corresponding threshold in the dither matrix, and a binary image (threshold pattern) can be obtained. However, in the event that the gradation of the input image signal is below the threshold of the dither matrix, one of bits (1, for example) is assigned to the pixel value of the obtained binary image, otherwise, the other of bits (0, for example) is assigned to the pixel value of the obtained binary image.

With the present embodiment, a binary image making up the background portion and a binary image making up the latent image portion are generated beforehand by inputting an appropriate input image signal such that the density of the background portion is generally equal to the density of the latent image portion using the dither method at the time of printing on sheets using a printer. A method for generating a background threshold pattern and a latent image threshold pattern in which the density of the background portion is generally equal to the density of the latent image portion at the time of printing on sheets using a printer will be described later.

Hereinafter, a binary image making up the background portion will be referred to as "background threshold pattern" and a binary image making up the latent image portion will be referred to as "latent image threshold pattern".

The present embodiment employs an arrangement wherein a combination of the background threshold pattern and the latent image threshold pattern that are patterns (binary images) making up the background portion and the latent image portion is determined beforehand such that the density of the background portion is generally equal to the density of the latent image portion at the time of printing, a logical operation is executed using a copy-forgery-inhibited pattern basic image that is a binary image for specifying the background threshold pattern, the latent image threshold pattern, the latent image portion, and the background portion, and a camouflaged region specification image that is a binary image for specifying a camouflaged region, such that a copy-forgery-inhibited pattern image can be generated at high speed in a memory-saving manner.

The background threshold pattern and the latent image threshold pattern are parameters for determining the density of the background portion and the latent image portion of the copy-forgery-inhibited pattern image at the time of printing, and are specific components of "copy-forgery-inhibited pattern density parameters". Also, the logical operation of on/off of a dot corresponding to the copy-forgery-inhibited pattern image for each pixel is executed to generate the copy-forgery-inhibited pattern image, thus the amount of memory necessary for generating the copy-forgery-inhibited pattern image can be significantly reduced.

FIG. 1 is a block diagram of the internal processing of a copy-forgery-inhibited pattern combination printing device according to a first embodiment. This copy-forgery-inhibited pattern combination printing device includes a copy-forgery-inhibited pattern image generating unit (background texture image generating unit) 101, a combining unit (synthesizing unit) 102, a printing data processing unit 103, and a printing unit 104. Note that with the present embodiment, description will be made wherein the copy-forgery-inhibited pattern combination printing device includes the aforementioned devices, but the present invention is not restricted to this configuration. For example, an arrangement can be made in which a system includes the copy-forgery-inhibited pattern image generating unit 101, the combining unit 102, and the printing data processing unit 103, which are included in a single device such as a computer, and the printing unit 104 serving as a printing device capable of communicating with each aforementioned computer.

First, an input background image 111, color information 112, processing region information 113, a latent image threshold pattern 114, a background threshold pattern 116, a copy-forgery-inhibited pattern basic image 115, and a camouflaged region specification image 117, are input to the copy-forgery-inhibited pattern image generating unit 101, which generates and outputs a copy-forgery-inhibited pattern image 118. The copy-forgery-inhibited pattern image generating unit 101 subjects the input background image 111 to image processing in accordance with a certain rule, and generates the copy-forgery-inhibited pattern image 118. Note that the input background image 111 may be a multi-valued image or a binary image. Also, the processing region information 113 is information indicating a region to be embedded with a copy-forgery-inhibited pattern, of input image information.

The copy-forgery-inhibited pattern basic image 115 is an image for specifying a minimal element including the latent image portion and the background portion, and is made up of one pixel per one bit. One of the bits (1, for example) of the copy-forgery-inhibited pattern basic image 115 represents the latent image portion, and the other bit (0, for example) represents the background portion. The camouflaged region specification image 117 is an image for specifying a region to be faded in density so as to obtain a camouflage effect, and is made up of one pixel per one bit in the same way as the copy-forgery-inhibited pattern basic image 115. One of bits (1, for example) of the camouflaged region specification image 117 represents other than a camouflaged region, and the other of bits (0, for example) represents a camouflaged region of which density is faded compared to its surroundings.

As described above, the background threshold pattern 116 and the latent image threshold pattern 114 are generated by subjecting an appropriate image signal to threshold processing using the background dither matrix threshold and the latent image dither matrix threshold respectively so as to obtain equal density at the time of printout.

Next, the copy-forgery-inhibited pattern image 118 generated at the copy-forgery-inhibited pattern image generating unit 101 is output to the combining unit 102. Description will be made later regarding the method for generating the copy-forgery-inhibited pattern image 118 in detail.

The combining unit 102 combines the input an input document image 119 and the generated copy-forgery-inhibited pattern image 118 to generate a copy-forgery-inhibited pattern combined output document image. Note that in the event that the copy-forgery-inhibited pattern image 118 becomes the copy-forgery-inhibited pattern combined output document image without any change regardless of the content of the input document image 119, the combining unit 102 does not need to reference the input document image 119. At this time, an arrangement can be made wherein the color matching processing is performed for each object making up the copy-forgery-inhibited pattern image 118 and the input document image 119, following which the object making up the input document image 119 and the copy-forgery-inhibited pattern image 118 are combined to generate the copy-forgery-inhibited pattern combined output document image. Alternatively, the subsequent printing data processing unit 103 may subject the copy-forgery-inhibited pattern combined output document image to the color matching processing.

Next, the printing data processing unit 103 receives the copy-forgery-inhibited pattern combined output document image combined at the combining unit 102 via the drawing interface of an operating system (for example, Graphic Device Interface (GDI) of the Windows® series which is the operating system produced by Microsoft® Corporation, QucikDraw® of the Macintosh® OS series which is the operating system produced by Apple Computer®, or the like, are well known) as drawing information, and sequentially converts this into a printing command. At this time, image processing such as color matching, RGB-to-CMYK (Red-Green-Blue to CYAN-Magenta-Yellow-Black) conversion, halftone processing, etc., is performed as necessary. Subsequently, the printing data processing unit 103 sends a data format (for example, the data format described in a page description language or the data format rendered to a printing bitmap) construable for the printing unit 104 to the subsequent printing unit 104 as the copy-forgery-inhibited pattern combined output document image data.

The printing unit 104 prints out a copy-forgery-inhibited pattern combined output document in accordance with information of the input copy-forgery-inhibited pattern combined output document image data. A description will be provided next regarding the case of a laser beam printer, for example. The printing unit 104 includes a printer controller (not shown) and a printer engine (not shown). This printer controller includes a printing information control unit, page memory, an output control unit, and the like. The printing information control unit analyzes the page description language (PDL) sent from the printing data processing unit 103, and renders the corresponding pattern to page memory regarding commands related to drawing and printing.

Here, image processing such as the RGB-to-CMYK processing, halftone processing, and the like is processed as necessary. In the event that the data format is determined as a printing bitmap, the image data is directly rendered to page memory.

The output control unit converts the contents of page memory into video signals, and outputs these to the printer engine. The printer engine includes, for example, the transporting mechanism of a recording medium, a semiconductor laser unit, a photosensitive drum, a developing unit, a fixing unit, a drum cleaning unit, a separating unit, and the like, and performs printing using known electro-photographic process.

In the event that the copy-forgery-inhibited pattern image generating unit 101 generates a copy-forgery-inhibited pattern image on the assumption that each pixel is printed out using only primary colors (cyan, yellow, magenta, and black), printing each pixel to be represented in primary colors using multiple different color ink and toner is not desirable. Accordingly, with the printing data processing unit 103 and the printing unit 104, pixel values (for example, cyan, magenta, yellow, and black) equivalent to the copy-forgery-inhibited pattern image of the copy-forgery-inhibited pattern combined output document image can be set such that the pixel value of each pixel is not represented by a mixture of different color ink or toner at the time of printing.

More specifically, color conversion processing such as the color matching is omitted, even after performing the halftone processing, settings for printing each pixel using single color ink or toner can be performed constantly. However, this is not applied to the case in which each pixel of the copy-forgery-inhibited pattern image is represented by the same color light ink/dark ink, or a large ink dot or a small ink dot using an inkjet printer. Also, as a color variation of the copy-forgery-inhibited pattern image, the copy-forgery-inhibited pattern image to be mistaken as a green color at first glance can be generated by disposing cyan pixels and yellow pixels in a balanced manner, even in this case, if each pixel of the copy-forgery-inhibited pattern image is only made up of the primary colors of a printer (cyan, yellow, magenta, and black), each pixel of the copy-forgery-inhibited pattern image can be output using only the corresponding cyan or yellow toner or ink in an accurate manner.

However, even if each pixel of the copy-forgery-inhibited pattern image is not printed out using the primary colors of a printer (cyan, yellow, magenta, and black), an image for realizing the effects of a copy-forgery-inhibited pattern can be generated. Even if each pixel of the copy-forgery-inhibited pattern image is represented with multiple different color ink or toner, such a copy-forgery-inhibited pattern image can be employed as an anti-counterfeit copy-forgery-inhibited pattern as long as a latent image remains after copying.

Note that with the following embodiments, the copy-forgery-inhibited pattern image, input document image, copy-forgery-inhibited pattern combined output document image, copy-forgery-inhibited pattern combined output document image data are all digital data, and the copy-forgery-inhibited pattern combined output document represents an image printed on sheets.

Figure 2:
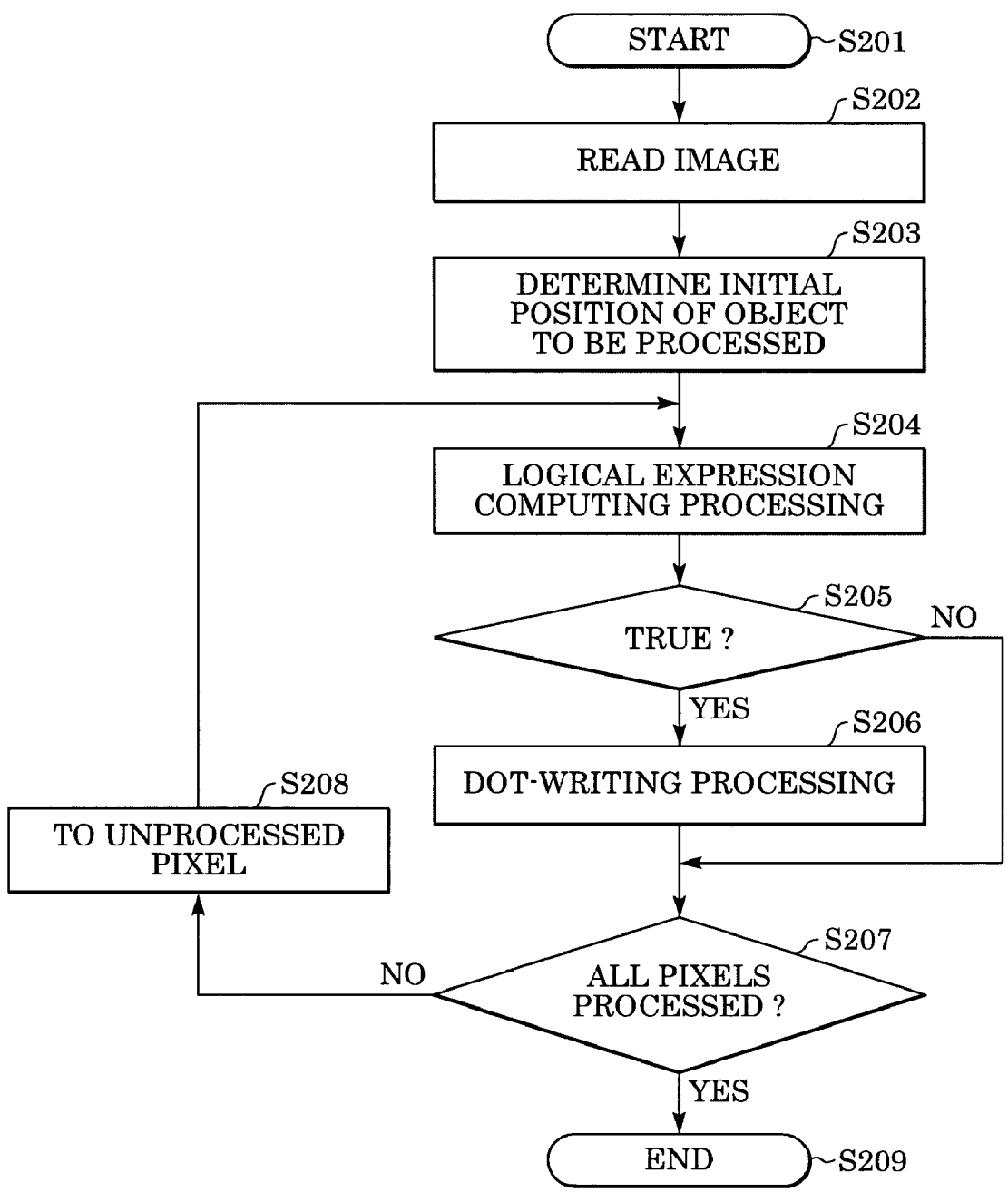
FIG. 2 is a flowchart illustrating operation for generating a copy-forgery-inhibited pattern image according to the first embodiment of the present invention.

Next, description will be made regarding the internal processing of the anti-counterfeit copy-forgery-inhibited pattern generating device with reference to FIG. 2. FIG. 2 is a flowchart illustrating the internal procedures of the copy-forgery-inhibited pattern image generating unit 101 according to the first embodiment.

First, the copy-forgery-inhibited pattern image generating processing is started through a user interface or the like in Step S201. Next, in Step S202, the copy-forgery-inhibited pattern image generating unit 101 inputs the input background image 111, background threshold pattern 116, latent image threshold pattern 114, copy-forgery-inhibited pattern basic image 115, and camouflaged region specification image 117.

Next, in Step S203, the initial pixel is determined at the time of generating the copy-forgery-inhibited pattern image. For example, the entire input image is subjected to image processing from upper left to lower right in the raster scanning order, and in the event of changing the input image to the copy-forgery-inhibited pattern image, the initial position is set to upper left.

Next, in Step S204, the background threshold pattern 116, latent image threshold pattern 114, copy-forgery-inhibited pattern basic image 115, and camouflaged image 117 are disposed from upper left of the input background image 111 in a tiled manner, the following expression (1) is calculated as to the pixels of the input background image 111 to be processed to determine whether or not to write the pixel values corresponding to the dots at the time of printing. At this time, the pixel values correspond to the input color information 112.

$$nWriteDotOn = \\ nCamouflage \times ((nSmallDotOn \times -nHiddenMark) + \\ (nLrgeDotOn \times nHiddenMark)) \quad (1)$$

where nCamouflage: in the camouflaged image, if the pixel to be processed is a pixel making up the camouflaged image, 0 is set, otherwise, 1 is set.

nSmallDotOn: if the pixel value of the background threshold pattern is black, 1 is set, or if the pixel value is white, 0 is set (the color is not restricted to these).

nLrgeDoton: if the pixel value of the foreground threshold pattern is black, 1 is set, or if the pixel value is white, 0 is set (the color is not restricted to these).

nHiddenMark: with the copy-forgery-inhibited pattern basic image, if the pixel to be processed is a pixel making up the latent image, 1 is set, or if the pixel to be processed is a pixel making up the background image, 0 is set.

−nHiddenMark: negation of nHiddenMark; the latent image portion is 0, and the background portion is 1.

At this time, determination may be made as to whether or not to write the pixel values corresponding to the dots at the time of printing with reference to the pixel values of the input background image. In this case, the right side of Expression (1) can be multiplied by the item (nBackground) obtained by referring to the input background image. This nBackground is 1 if the input background image is a region having specific pixel values (white background region), otherwise nBackground is 0.

Also, with each pixel to be processed, all components of Expression (1) do not need to be used for calculation. As described below, omitting unnecessary calculation improves processing speed.

For example, if nHiddenMark=1, −nHiddenMark=0, or if nHiddenMark=0, −nHiddenMark=1. Accordingly, if nHiddenMark=1, the value of the following Expression (2) can be set to the value of nLrgeDotOn, or if nHiddenMark=0, the value of Expression (2) can be set to the value of nSmallDotOn.

Also, the entirety of Expression (2) following ncamouflage is multiplied by nCamouflage, so in the event that nCamouflage=0, then nWriteDotOn=0. Accordingly, if ncamouflage=0, so Expression (2) can be omitted.

$$(nSmallDotOn \times -nHiddenMark) + (nLrgeDotOn \times nHiddenMark) \quad (2)$$

Also, with the copy-forgery-inhibited pattern image to be generated, an image of the least common multiple size of the vertical lengths and horizontal lengths of the background threshold pattern 116, latent image threshold pattern 114, copy-forgery-inhibited pattern basic image 115, and camouflaged region specification image 117 is a minimum unit for repetition. Accordingly, the copy-forgery-inhibited pattern image generating unit 101 generates only a part of the copy-forgery-inhibited pattern image serving as a minimum unit for repetition, and the part of the copy-forgery-inhibited pattern image is arrayed repeatedly up to the size of the input background image in a tiled manner, and processing time necessary for generation of the copy-forgery-inhibited pattern image 118 can be reduced.

Next, in Step S205, determination of the calculated result (value of nWriteDoton) in Step S204 is made. Here, if nWriteDotOn=1, the flow proceeds to Step S206, while if nWriteDotOn=0, the flow proceeds to Step S207.

In Step S206, processing for writing the pixel values corresponding to the dots at the time of printing is performed. The value of pixels can be changed by the color of the copy-forgery-inhibited pattern image 118. In the event of creating a black copy-forgery-inhibited pattern, the pixels to be processed of the input background image 111 are set to black. In addition, setting to cyan, magenta, or yellow so as to match the toner or ink of a printer can create the color copy-forgery-inhibited pattern image 118.

In the event that the input background image 111 is image data of 1 to several bits per one pixel, the pixel values thereof can be represented using an index color. The index color is a method for representing image data, color information frequently used in a color image to be processed is set to an index (for example, index 0 is white, index 1 is cyan, and the like), the value of each pixel is represented by the index number in which color information is described (for example, a first pixel value is the value of the index 1, a second pixel value is the value of the index 2, and so forth).

In Step S207, determination is made as to whether or not all pixels of the region to be processed in the input background image 111 have been processed. In the event that all pixels of the region to be processed in the input background image 111 have not been processed yet, the flow proceeds to Step S208, where an unprocessed pixel is selected, and processing in Step S204 through Step S206 is performed again. On the other hand, in the event that all pixels of the region to be processed in the input background image 111 have been processed already, the flow proceeds to Step S209, where image processing in the copy-forgery-inhibited pattern image generating unit 101 ends. Due to the aforementioned processing, the copy-forgery-inhibited pattern image 118 obtained by subjecting the input background image 111 to image processing can be generated.

Next, description will be made regarding a method for disposing dots on the latent image portion and the background portion according to the following embodiments. With the following embodiments, description will be made regarding the case in which the latent image portion is generated based on a dot-concentrated dither matrix, and the background portion is generated based on a dot-dispersed dither matrix. A representative type of dot-concentrated dither matrices used for generating the latent image portion is the spiral dither matrix.

FIG. 3A is a diagram illustrating an example of a 4×4 spiral dither matrix. The thresholds of the 4×4 spiral dither matrix are arrayed in a form wherein the value of the threshold increases from the center in a spiral manner.

FIG. 3B is a diagram illustrating a threshold pattern (array of dots) obtained by subjecting a predetermined input image signal to threshold processing using the 4×4 spiral dither matrix in FIG. 3A. FIG. 3B illustrates a threshold pattern obtained by subjecting four input image signals to threshold processing using the dither matrix shown in FIG. 3A. The threshold pattern (array of dots) thus obtained is a pattern in which each dot is disposed in concentrated manner.

On the other hand, a representative type of dot-dispersed dither matrices making up the background portion is the Bayer dither matrix. A Bayer N×N dither matrix is represented by the following expression (3).

$$D_N = \begin{bmatrix} 4D_{N/2} & 4D_{N/2} + 2U_{N/2} \\ 4D_{N/2} + 3U_{N/2} & 4D_{N/2} + U_{N/2} \end{bmatrix} \quad (3)$$

where N represents an exponential of 2, and $U_N$ means that each element is the N×N matrix of 1.

FIG. 3C is a diagram illustrating an example of a 4×4 Bayer dither matrix. A threshold pattern generated by subjecting an arbitrary input image signal to dither processing using a Bayer dither matrix is designed such that each dot is disposed in a dispersed manner.

FIG. 3D is a diagram illustrating a threshold pattern (array of dots) obtained by subjecting a predetermined input image signal to threshold processing using the 4×4 Bayer dither matrix in FIG. 3C. FIG. 3D illustrates a threshold pattern obtained by subjecting four input image signals to threshold processing using the dither matrix shown in FIG. 3C. The threshold pattern (array of dots) thus obtained is a pattern in which each dot is disposed in dispersed manner. With a Bayer dither matrix, respective elements of the threshold matrix are disposed so as not to come into contact with each other in order, and the threshold pattern is a pattern in which each dot is arrayed in an isolated-grid manner. In the event that the size of a dither matrix increases, a cyclical pattern due to the matrix is sometimes conspicuous, but employing a specific gradation can yield a beautiful cyclical pattern.

With the following embodiments, description will be made to a case in which a Bayer dither matrix is employed as the dither matrix used for the background portion, but the dither matrix is not restricted to the Bayer dither matrix. Other dot-dispersed dither matrices may be employed instead of a Bayer dither matrix.

For example, a blue noise mask is also an example of a dot-dispersed dither matrix used for a background portion. With this blue noise mask, all of the threshold patterns at an arbitrary gradation have blue noise properties, the distribution of black pixels making up a threshold pattern is random but high in uniformity, and graininess is less conspicuous. Also, the term "blue noise properties" mean that the output pattern of a point in the case of setting an arbitrary gradation is locally aperiodic and isotropic, and has less low-frequency components. The threshold pattern obtained from a blue noise mask prevents moire from occurring, makes irregularities in sheet feeding less conspicuous, and the like, thus obtaining a visually desirable output pattern.

Alternatively, a dot-dispersed dither matrix of which the threshold pattern at a specific or arbitrary gradation is cyclical (pseudo-cyclical) and non-isotropic, and has less low-frequency components may be employed instead of a blue noise mask. Also, though a method not using the threshold pattern, the configuration of the background portion using the error diffusion method may be employed in the following embodiments. In the event that the background threshold pattern is generated using the above-described Bayer dither matrix or a blue mask pattern, the value of nSmallDotOn in Expression (1) can be read out by referencing the background threshold pattern. On the other hand, in the event of employing the error diffusion method, gradation corresponding to the background density and sum of errors propagated from the surrounding pixels are compared with predetermined thresholds for each pixel, on/off of the dots in the pixel to be processed can be determined to be used as the value of nSmallDotOn. At this time, the error caused by on/off of the dots is weighted and distributed to nearby pixels. The pixel value of an unprocessed pixel becomes the sum of the original input pixel value corresponding to the density of the background portion and the distributed errors.

Note that in the same way as the background threshold pattern, the gradation corresponding to the density of the background portion is prepared beforehand. The error diffusion method is a time consuming method, which is a disadvantage, but can obtain an image having excellent visual properties wherein dots are uniformly dispersed, which is an advantage. Since the error diffusion method is a well-known method, description thereof will be omitted here. In the same way, methods improving the error diffusion method are also applicable.

Also, a threshold pattern at each gradation does not need to be generated based on a dither matrix. A unique background threshold pattern and latent image threshold pattern may be generated for each gradation. This case provides an advantage wherein threshold patterns having an excellent image quality can be collected for each gradation.

FIG. 4 is a diagram for comparing the area ratio of black pixels in the background threshold pattern with that in the latent image threshold pattern. According to FIG. 4, the vertical and horizontal sizes of a background dither matrix are X_S and Y_S respectively, the gradation of an input image signal is T_S, the vertical and horizontal sizes of a latent image dither matrix are X_L and Y_L respectively, and the gradation of an input image signal is T_L.

At this time, the ratio occupied by black pixels within the background threshold pattern is P_S=T_S/(X_S*Y_S), and the ratio occupied by black pixels within the latent image threshold pattern is P_L=T_L/(X_L*Y_L).

First Embodiment

Next, with the copy-forgery-inhibited pattern image generation using the aforementioned image processing device as a basic principle, description will be made regarding processing in generating an image by overlaying a contents image (digitized contents data) to be input as the input image document 119 with a copy-forgery-inhibited pattern image, wherein in the event that a change of layout accompanying enlargement or reduction of the contents image is requested, while adjusting the copy-forgery-inhibited pattern image to enlargement or reduction processing, the appropriate copy-forgery-inhibited pattern image is generated without deteriorating the function as a copy-forgery-inhibited pattern.

Note that hereinafter, description will be made in which the change of layout required for the contents image includes enlargement processing of the contents image for dividing the contents data of one page into multiple sheets and printing the sheets, and reduction processing of the contents data for printing the contents data of multiple pages onto one face of a single sheet such as so-called 2-in-1 printing, for example.

Figure 5:
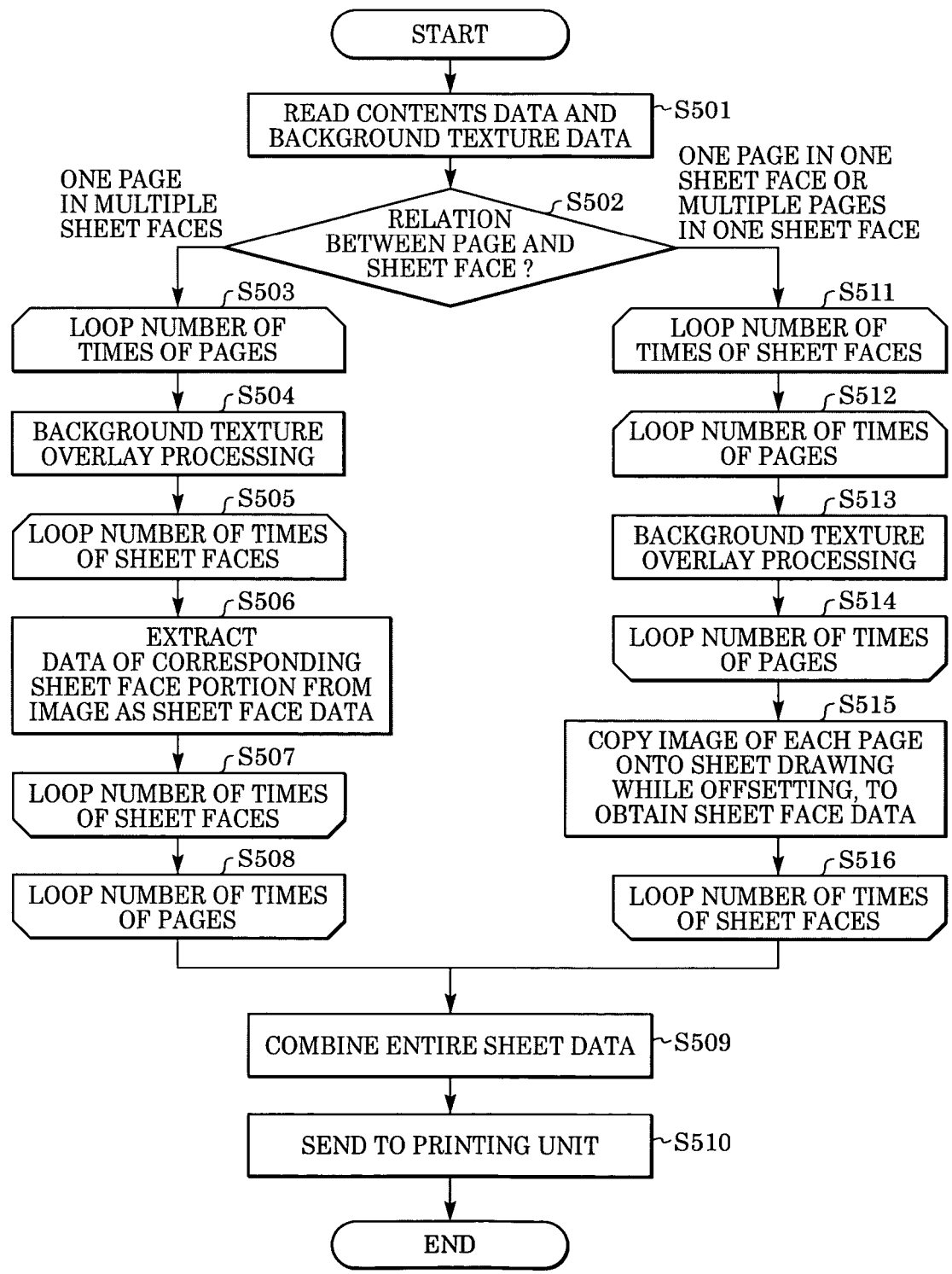
FIG. 5 is a flowchart illustrating operation for performing copy-forgery-inhibited pattern printing.

FIG. 5 is a flowchart illustrating operation of image generation processing according to the present embodiment, and relates to operation for overlaying the contents data with the copy-forgery-inhibited pattern image. This processing is realized by the CPU of the image processing device executing a program for image generation processing using the later-described modules and units within the image processing device.

Note that description will be made by way of an example in which the following processing is performed by the combining unit 102 and the printing data processing unit 103, but the present invention is not restricted to this configuration.

First, in Step S501, the combining unit 102 reads contents data and copy-forgery-inhibited pattern image data created by using electronic document applications.

Next, in Step S502, the combining unit 102 compares the number of pages of the contents data with the number of sheet faces specified by a printing request, and determines the relation between the number of pages and the number of sheet faces. As a result of this determination, in the event that the contents data of one page is divided and printed onto multiple sheet faces, the flow proceeds to Step S503. On the other hand, in the event that the contents data of one page or the contents data of multiple pages is printed onto one single sheet face, the flow proceeds to Step S511.

In Step S503, loop processing of the number of times of pages is started. Subsequently, in Step S504, the contents image data is subjected to overlay processing of the copy-forgery-inhibited pattern image, and here the copy-forgery-inhibited pattern image is subjected to enlargement processing. Note that description will be made later regarding the details of copy-forgery-inhibited pattern image overlay processing.

Next, in Step S505, loop processing of the number of times of sheet faces is started. Subsequently, in Step S506, the printing data processing unit 103 divides the image of one page into regions corresponding to the number of sheet faces. Subsequently, the printing data processing unit 103 extracts the data (contents data and copy-forgery-inhibited pattern image data) of the sheet face portion corresponding to one sheet face region from the divided image for each sheet face. The extracted data is employed as sheet face data.

Next, in Step S507, the printing data processing unit 103 determines whether or not the processing in Step S506 has been repeated the number of times of the sheet faces. As a result of this determination, in the event that determination is made that the processing in Step S506 has been repeated the number of times of the sheet faces, the loop processing of the number of times of the sheet faces ends, and the flow proceeds to Step S508. On the other hand, in the event that the processing in Step S506 has not been repeated the number of times of the sheet faces, the processing in Step S506 is repeated.

In Step S508, the printing data processing unit 103 determines whether or not the processing in Step S504 through Step S507 has been repeated the number of times of the pages. In the event that the printing data processing unit 103 determines that the processing in Step S504 through Step S507 has been repeated the number of times of the pages, the loop processing of the number of times of the pages ends, and the flow proceeds to Step S509. On the other hand, in the event that the processing in Step S504 through Step S507 has not been repeated the number of times of the pages, the processing in Step S504 through Step S507 is repeated.

On the other hand, in Step S502, in the event that determination is made that the contents data of one page or the contents data of multiple pages is printed onto one single sheet face, the flow proceeds to Step S511, where the loop processing of the number of times of the sheet faces is started. Further, in Step S512, the loop processing of the number of times of the pages is started.

Next, in Step S513, the combining unit 102 executes the copy-forgery-inhibited pattern image overlay processing. Here, in the event that the contents data of multiple pages is printed onto a single sheet face (Nup processing), the copy-forgery-inhibited pattern image is subjected to reduction processing. Description will be made later regarding the details of the copy-forgery-inhibited pattern image overlay processing.

In Step S514, the printing data processing unit 103 determines whether or not the processing in Step S513 has been repeated the number of times of the pages printed on a single sheet face. As a result of this determination, in the event that the printing data processing unit 103 determines that the processing in Step S513 has been repeated the number of times of the pages, the loop processing of the number of times of the pages ends, and the flow proceeds to Step S515. On the other hand, in the event that the processing in Step S513 has not been repeated the number of times of the pages printed on a single sheet face, the processing in Step S513 is repeated.

Next, in Step S515, each page image (contents data and copy-forgery-inhibited pattern image data) is sequentially offset, and copied onto a sheet face to generate sheet face data.

In Step S516, the printing data processing unit 103 determines whether or not the processing in Step S512 through Step S515 has been repeated the number of times of the sheet faces. As a result of this determination, in the event that the printing data processing unit 103 determines that the processing in Step S512 through Step S515 has been repeated the number of times of the sheet faces, the loop processing of the number of times of the sheet faces ends, and the flow proceeds to Step S509. On the other hand, in the event that the processing in Step S512 through S515 has not been repeated the number of times of the sheet faces, the processing in Step S512 through Step S515 is repeated.

In Step S509, all of the sheet face data extracted in the above-described processing is combined. Subsequently, in Step S510, the combined sheet face data is sent to the printing unit, and the processing ends.

Figure 6:
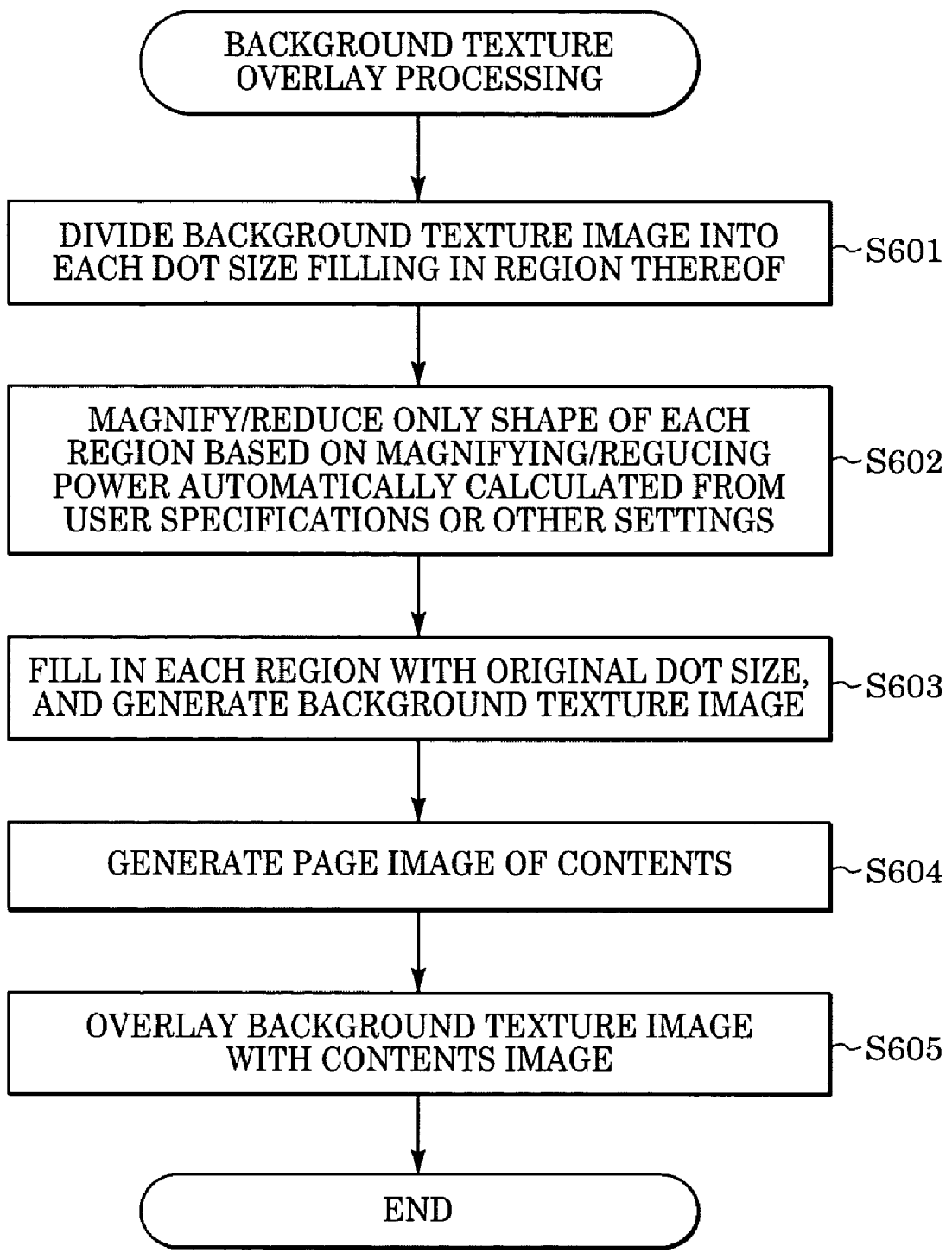
FIG. 6 is a flowchart illustrating operation for enlarging/reducing a copy-forgery-inhibited pattern image according to the first embodiment of the present invention.

FIG. 6 is a flowchart illustrating operation of the copy-forgery-inhibited pattern image overlay processing performed in Step S504 and Step S513 illustrated in FIG. 5. Note that with the present embodiment, bitmap data is employed as the copy-forgery-inhibited pattern image data.

First, in Step S601, the combining unit 102 sections the entire copy-forgery-inhibited pattern image of one page into a grid, and divides the sectioned images into predetermined sized blocks. Subsequently, detection of dot sizes in the divided block is performed for each block, and the size of each dot included in each block is determined.

As a result of this determination, in the event that the multiple sized dots are formed in one block, the block is further divided into smaller blocks, and detection of dot sizes is performed for each block. Sectioning blocks into a grid is repeated until each block is made up of the uniform-sized dots. Thus, the copy-forgery-inhibited pattern image is divided into blocks made up of the uniform-sized dots.

Subsequently, in the event that adjacent blocks are made up of the same-sized dots, determination is made that the two blocks belong to the same region, and the region is expanded for each dot size, resulting in dividing the entire copy-forgery-inhibited pattern image into several regions for each dot size.

In Step S602, all the boundary lines serving as vector data of the divided regions are enlarged or reduced by a specified magnification factor. In other words, the boundary lines between the latent image portion and the background portion in the copy-forgery-inhibited pattern image, i.e., only the outlines of the image in the latent image portion or background portion hidden as the copy-forgery-inhibited pattern are enlarged or reduced based on a specified magnification factor. Thus, the enlarged or reduced image data including only the boundary lines can be obtained. Note that a specified magnification factor is automatically calculated based on user specifications or the other settings. Also, in the event that image data of two pages is assigned to a single sheet, i.e., in the event of performing so-called Nup (N-in-1) processing, a predetermined reduction can be used.

In Step S603, each region in the image data only including the boundary lines obtained in the processing in Step S602 is formed using the original dot size (the dot size prior to enlargement or reduction in Step S602, i.e., the dot size detected in the processing in Step S601), and a new copy-forgery-inhibited pattern image is generated. Accordingly, a new copy-forgery-inhibited pattern image is generated by enlarging or reducing only the regions of the latent image portion and the background portion by a desired magnification factor without changing the dot size forming the shapes and the inner portions of the latent image portion and the background portion in the copy-forgery-inhibited pattern image. In Step S604, the page image of the contents is generated. Further, in Step S605, the copy-forgery-inhibited pattern image generated in Step S603 is overlaid with the contents image generated in Step S604, and the processing ends.

According to the above-described processing, independently of enlargement processing or reduction processing as to the contents, only the regions of the latent image portion and the background portion in the copy-forgery-inhibited pattern image are enlarged or reduced by a specified magnification factor, and the latent image portion and the background portion are formed by dots in a predetermined dot size (dot size when the magnification factor is 1) regardless of the specified magnification factor, thus a copy-forgery-inhibited pattern image enlarged or reduced by a specified magnification factor can be generated without deteriorating the function of a copy-forgery-inhibited pattern image.

Figure 7A:
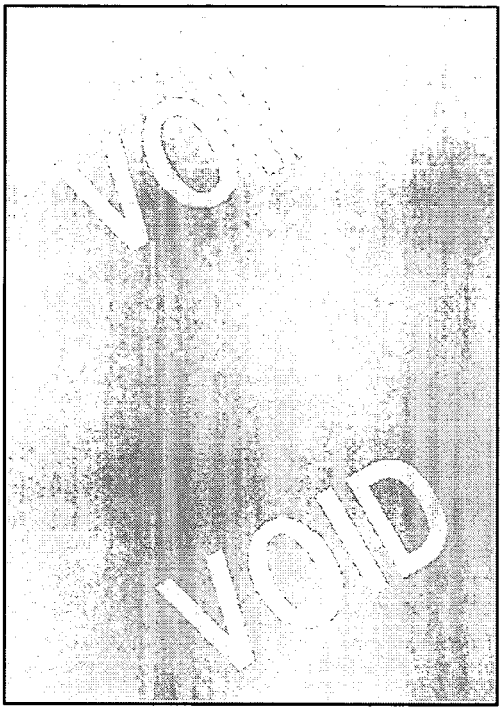
FIG. 7 is a diagram illustrating an example of the relation between copy-forgery-inhibited pattern image data and contents data.

Description will be made next regarding the contents image to which a copy-forgery-inhibited pattern image to be generated as described above is added with reference to FIG. 7 and FIG. 8. FIG. 7A is a diagram illustrating a copy-forgery-inhibited pattern image, and FIG. 7B is a diagram illustrating contents to be printed along with the copy-forgery-inhibited pattern image illustrated in FIG. 7A.

As illustrated in FIG. 7A, the copy-forgery-inhibited pattern image includes the text "VOID" formed of a dot pattern in a size that can be read by the image scanner of a copier as an image in the latent image portion, and the portion other than the text formed of a dot pattern in a size that cannot be read by the image scanner of the copier as an image in the background portion.

Figure 7B:
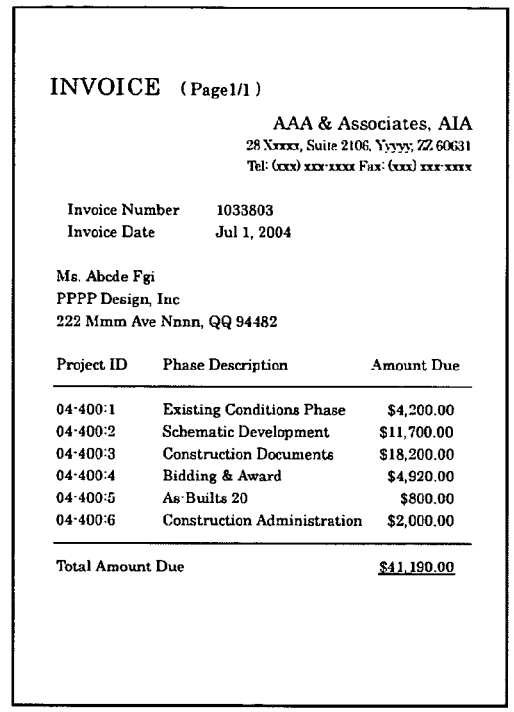
Figure 7C:
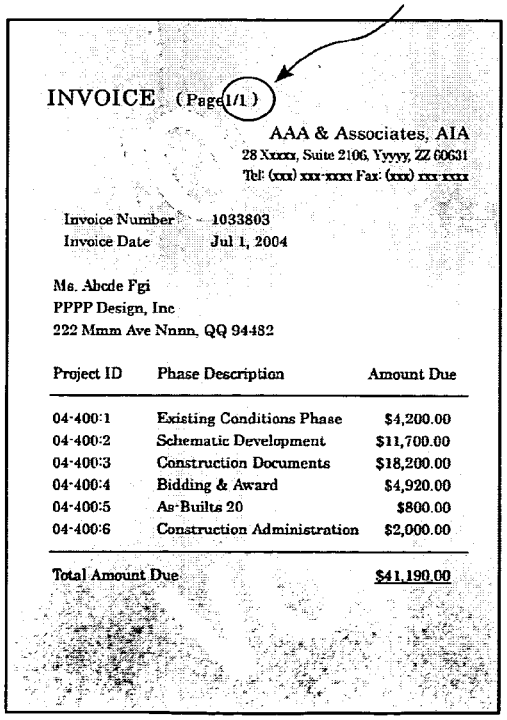
Figure 7D:
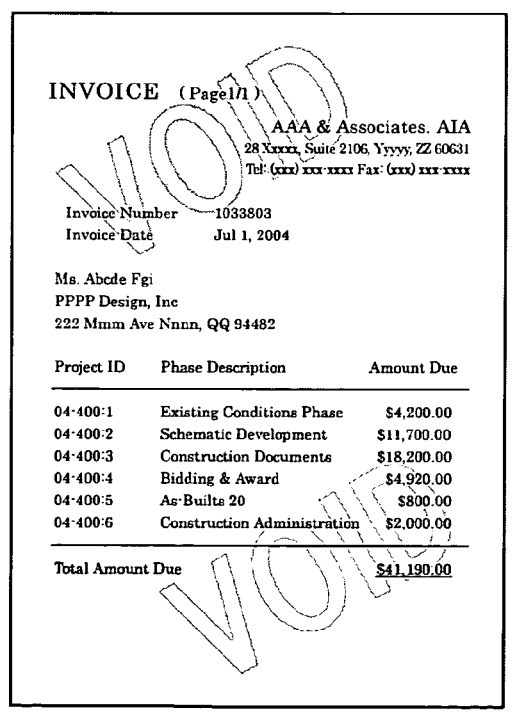

The printed matter of the contents data to which a copy-forgery-inhibited pattern image is added illustrated in FIG. 7C can be obtained by overlaying the copy-forgery-inhibited pattern image illustrated in FIG. 7A with the contents illustrated in FIG. 7B and printing this. Upon the printed matter illustrated in FIG. 7C being copied using a copier or the like, the background portion in the copy-forgery-inhibited pattern image disappears (or fades so as to come close to the paper color since density is reduced), and copied matter on which the contents such as shown in FIG. 7D and the latent image in the copy-forgery-inhibited pattern image are displayed can be obtained, which is different from the original printed matter illustrated in FIG. 7C.

Figure 8A:
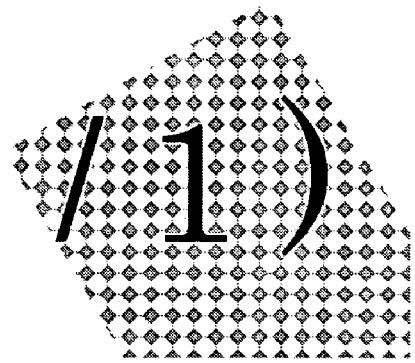
FIG. 8 is an enlarged diagram illustrating an example of the relation between copy-forgery-inhibited pattern image data and contents data.
Figure 8B:
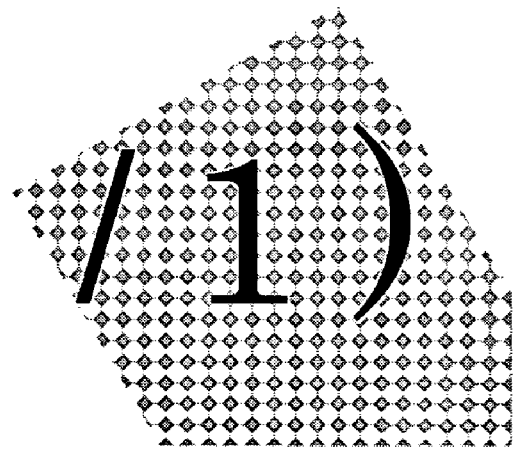
Figure 8C:
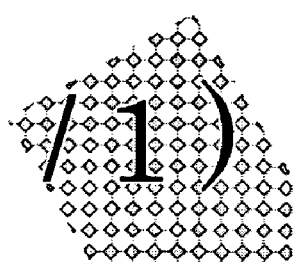

FIGS. 8A through 8C are diagrams enlarging a portion a in the printed matter of the contents data to which a copy-forgery-inhibited pattern image illustrated in FIG. 7C is added. FIG. 8A illustrates an image of which the magnification factor at the time of printing is 1, i.e., an image printed without performing enlargement and reduction, FIG. 8B illustrates an image enlarged (magnification factor >1) and printed, FIG. 8C illustrates an image reduced (magnification factor <1) and printed.

As illustrated in FIG. 8A through 8C, a contents image "/1)" is enlarged or reduced depending on the magnification factor at the time of printing. The latent image portion in the copy-forgery-inhibited pattern image is also enlarged or reduced depending on the magnification factor at the time of printing. Though not illustrated here, the background portion is also enlarged or reduced depending on the magnification factor at the time of printing. However, the size of the dots making up the latent image portion and the background portion is the same in FIG. 8A through FIG. 8C regardless of the magnification factor at the time of printing.

In other words, the latent image portion making up the copy-forgery-inhibited pattern image is formed of a dot pattern in a size that can be read by the image scanner of a copier, and the background portion is formed of a dot pattern in a size that cannot be read by the image scanner of the copier regardless of enlargement or reduction of the contents image or the copy-forgery-inhibited pattern image.

Accordingly, in the event of copying these, the latent image portion emerges (is manifested) in the copy-forgery-inhibited pattern image without any problem. A copy-forgery-inhibited pattern image enlarged or reduced depending on magnification factor at the time of printing can be generated without deteriorating the function of a copy-forgery-inhibited pattern image by generating and printing a copy-forgery-inhibited pattern image as described above.

Figure 9:
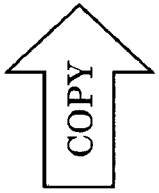
FIG. 9 is a diagram illustrating an image example of copied matter in the event of copying printed matter with a copy-forgery-inhibited pattern.

Note that with the above-described embodiment, description has been made regarding the copy-forgery-inhibited pattern image of which the latent image is regularly disposed on the entire page, for example. However, as illustrated in FIG. 9, in the event that a copy-forgery-inhibited pattern image is overlaid with contents data and printed, the relative size and positional relation between the contents and the latent image have some meanings in some cases. In FIG. 9, the creator of the contents and copy-forgery-inhibited pattern image intends that the latent image (the text "COPY") to be emerged on copied matter following copying printed matter is positioned lower right of the contents.

Figure 10:
FIG. 10 is a diagram illustrating an example of printed matter with a copy-forgery-inhibited pattern in the event of reducing only a contents image.

However, in the event that the copy-forgery-inhibited pattern image is in a fixed size, and only the contents is enlarged or reduced, and the copy-forgery-inhibited pattern image is overlaid with the contents and printed, as illustrated in FIG. 10 and FIG. 11, the latent image is printed at a position where the creator does not intend, and accordingly, not only does the printed matter lose its worth, but also adding the copy-forgery-inhibited pattern image loses its meaning.

Also, as in the past, in the event that the copy-forgery-inhibited pattern image is enlarged or reduced as well as the contents, the function of the copy-forgery-inhibited pattern deteriorates in some cases.

Even in such a case, the copy-forgery-inhibited pattern image is enlarged or reduced as the entire page and the position of the latent image of the copy-forgery-inhibited pattern image is adjusted as to the contents so as to match the enlargement/reduction magnification factor of the contents, and also the aforementioned present embodiment is applied to this case, wherein boundary lines of the regions are enlarged or reduced without changing the dot size forming the shapes and the inner portions of the latent image portion and the background portion in the copy-forgery-inhibited pattern image. Further, the enlarged or reduced copy-forgery-inhibited pattern image may be rotated as necessary.

Thus, the relative size and positional relation between the contents and the latent image can be retained without deteriorating the function of the copy-forgery-inhibited pattern image. In the event that the latent image emerges following copying, the meanings thereof are not deteriorated, and the copy-forgery-inhibited pattern image can be overlaid with the contents and printed.

Also, with the above-described embodiment, the enlargement and reduction processing of a copy-forgery-inhibited pattern image has been realized on the computer side, but an arrangement can be made in which the printer side making up a printer driver, the printing unit 104, and the like performs the enlargement and reduction processing of a copy-forgery-inhibited pattern image and overlays the copy-forgery-inhibited pattern image with contents data.

Also, with the above-described embodiment, description has been made regarding the case in which the latent image portion and the background portion have the predetermined-sized copy-forgery-inhibited pattern image formed in the regulated dot pattern, and the copy-forgery-inhibited pattern image is subjected to enlargement and reduction processing, but an arrangement can be made in which the latent image portion and the background portion specifying only the region (boundary lines between the latent image and the background image) are used as a copy-forgery-inhibited pattern image. These are subjected to enlargement processing and reduction processing, following which the regulated dot pattern is applied to the latent image portion and the background portion. Such a configuration will be described as a second embodiment.

Second Embodiment

Figure 12:
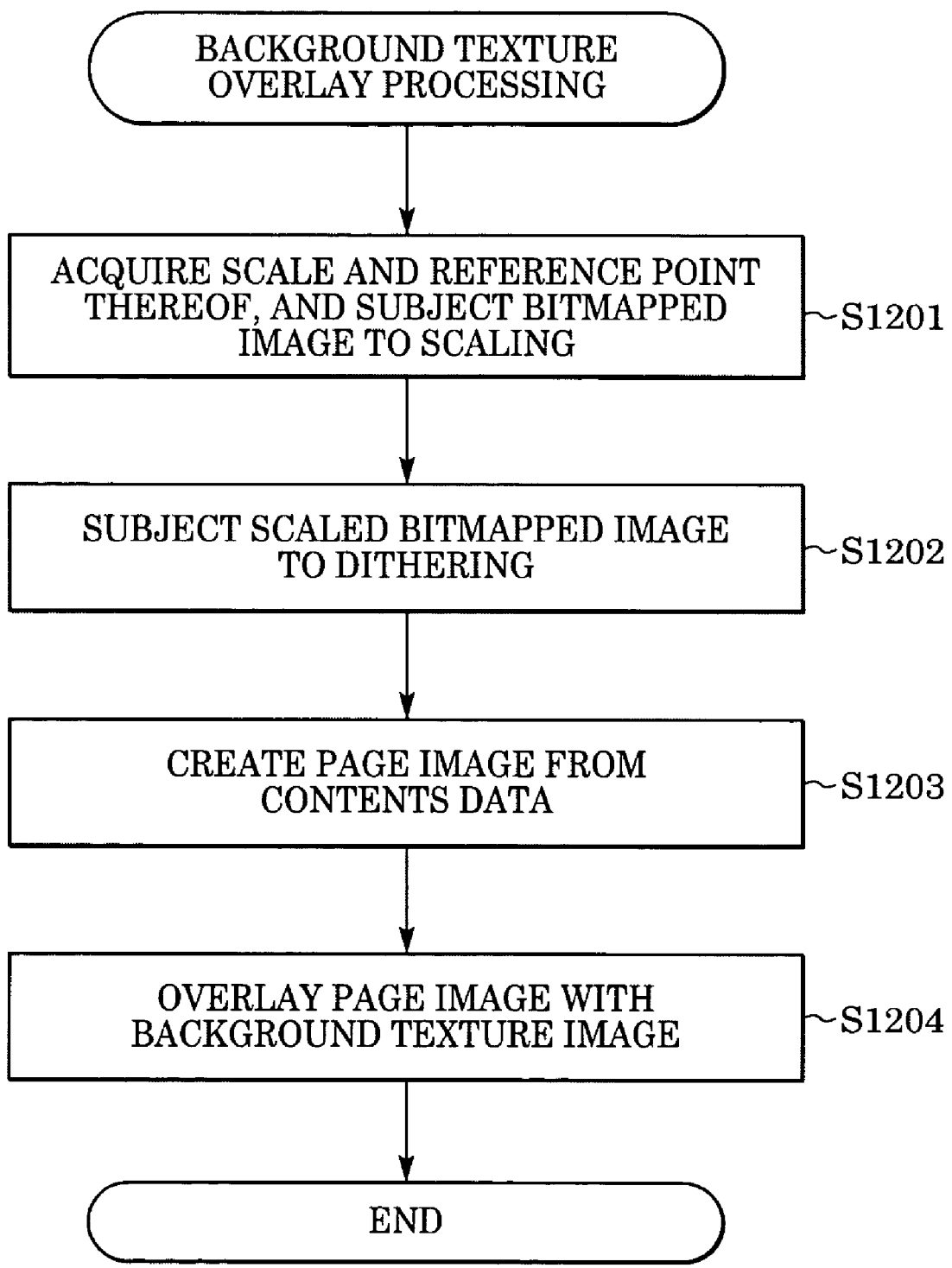
FIG. 12 is a flowchart illustrating operation for enlarging/reducing a copy-forgery-inhibited pattern image according to a second embodiment of the present invention.

FIG. 12 is a flowchart illustrating operation for enlarging/reducing a copy-forgery-inhibited pattern image according to a second embodiment. The description of the second embodiment assumes that the copy-forgery-inhibited pattern image generating unit 101 includes data relating to a text string as the latent image portion of a copy-forgery-inhibited pattern image.

This data relating to the text assumes the bitmap image of text, but other data formats may be employed. This bitmap image has a default copy-forgery-inhibited pattern image size. Examples of this include image data equivalent to the printable region of A4 sheets. This image is employed as a basic image, the text portions are converted into a latent image dot pattern on the basis of this basic image, and the other portions are changed to a background dot pattern.

Figure 13:
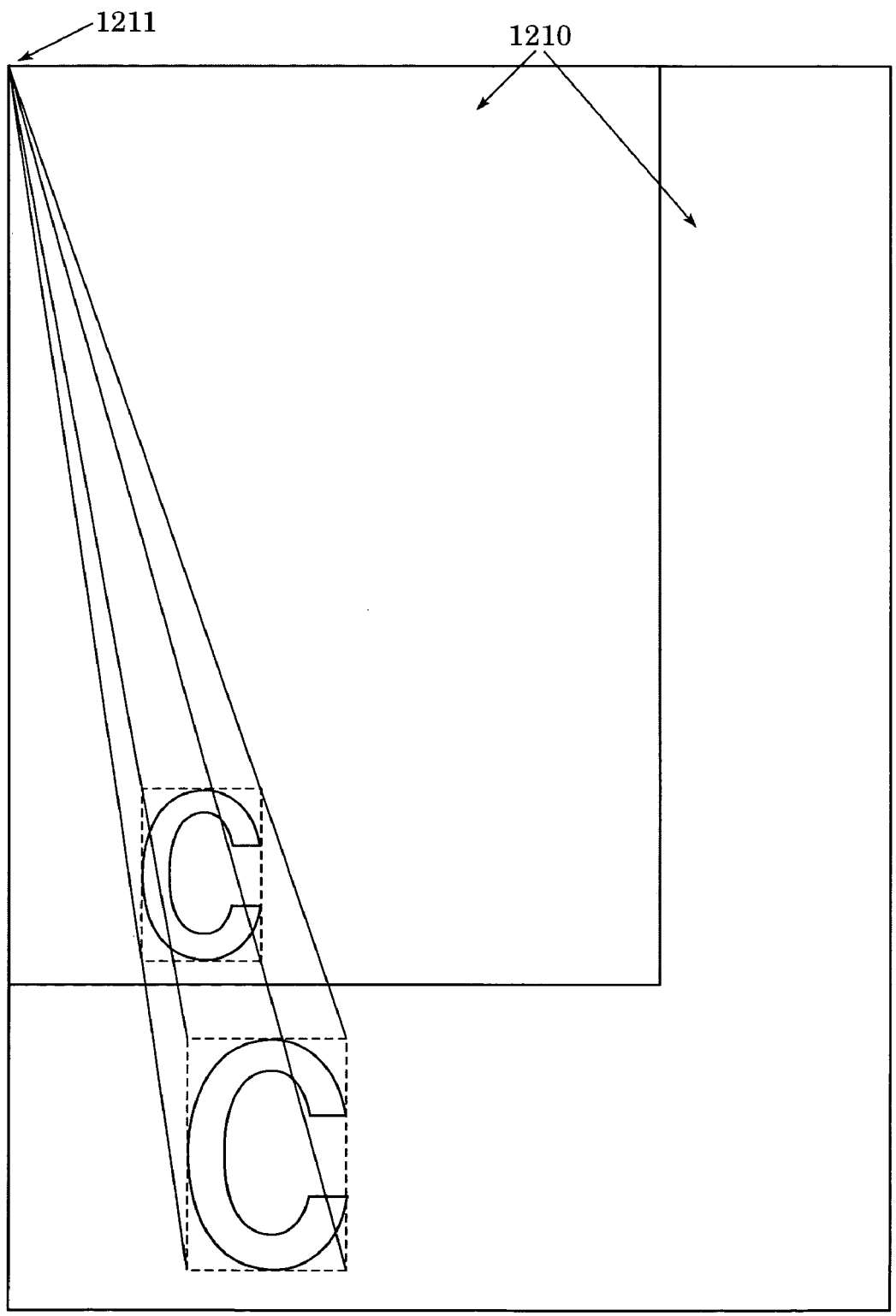
FIG. 13 is a diagram illustrating the concept of enlarging/reducing copy-forgery-inhibited pattern image data according to the second embodiment of the present invention.

First, in Step S1201, the magnification factor, and the reference point of the magnification factor are acquired, and the bitmap image serving as the basis of a copy-forgery-inhibited pattern image is subjected to enlargement/reduction based on the acquired information. This schematic view is illustrated in FIG. 13. In FIG. 13, an image is generated by enlarging/reducing a bitmap image 1210 serving as the basis of a copy-forgery-inhibited pattern image by a predetermined magnification factor as to a reference point 1211. Note that only "C" of a text "COPY" is illustrated in FIG. 13 for the sake of description, but the entire bitmap image serving as the basis may be enlarged/reduced as illustrated in FIG. 13. Thus, the bitmap image enlarged/reduced by a predetermined magnification factor can be obtained.

Note that the magnification factor is automatically calculated based on user specifications or the other settings. Also, in the event that image data of two pages is assigned to a single sheet, i.e., in the event of performing so-called Nup (N-in-1) processing, a predetermined reduction can be used.

Following this, in Step S1202, a copy-forgery-inhibited pattern image is generated by subjecting the enlarged/reduced bitmap image to dither processing. This processing for generating a copy-forgery-inhibited pattern image is based on the above-described logical operation, so description thereof will be omitted here.

Subsequently, in Step S1203, a page image is generated from contents data, following which, in Step S1204, the page image of the contents data is combined (overlaid) with the copy-forgery-inhibited pattern image generated in Step S1202, and the contents image having a desired copy-forgery-inhibited pattern is output. Note that combining the contents data with the copy-forgery-inhibited pattern image may be executed by the host computer side, or by the output device side such as a printer.

In the event that processing is performed such as shown in the present embodiment, the processing in Step S601 illustrated in FIG. 6 does not need to be performed, the amount of data processing can be further reduced.

Also, with the aforementioned embodiments, a copy-forgery-inhibited pattern image of which a text serving as a latent image emerges following copying has been shown for example, but a copy-forgery-inhibited pattern image having a drawing as a latent image may be employed, or a combination of text and drawing may be employed. Also, an arrangement can be made in which the relation between a latent image and a background is inversed in a copy-forgery-inhibited pattern image, and the text portion disappears following copying, or area density thereof is reduced compared to other regions, i.e., an outline image is generated.

Also, while both the above-described first and second embodiments realize enlarging/reducing of a copy-forgery-inhibited pattern image, an arrangement can be made wherein an input function for selecting whether or not a copy-forgery-inhibited pattern image is added to a contents image, or selecting whether or not a copy-forgery-inhibited pattern image is enlarged/reduced, along with the magnification factor of a contents image is provided to a user interface for setting various styles (input of text, angle, color, font, and so forth) of a copy-forgery-inhibited pattern image.

In the event that a user makes instructions to the effect that the copy-forgery-inhibited pattern image should not be enlarged/reduced, as described above as a conventional technique, the copy-forgery-inhibited pattern image is prohibited to follow the enlargement/reduction of the contents image. On the other hand, in the event that the user makes instructions to the effect that the copy-forgery-inhibited pattern image should be enlarged/reduced, the program can be switched to execute the enlargement/reduction according to the present invention.

Note that an arrangement wherein software program code for operating various devices to realize the functions of the aforementioned embodiments is supplied to a computer within a device or a system, which is connected to the various devices, and the various devices are operated in accordance with the program stored in the computer (CPU or MPU) within the system or the device, to realize the functions of the aforementioned embodiments, is also included in the scope of the present invention.

Also in this case, the software program code itself realizes the functions of the aforementioned embodiments, and the program code itself makes up the present invention. Also, a mechanism for supplying the program code to the computer, e.g., a recording medium storing the program code, may make up the present invention. Examples of the recording medium for storing the program code include flexible disks, hard disks, optical disks, optical magnetic disks, CD-ROM (compact disk-read-only memory), magnetic tape, nonvolatile memory cards, and ROM. Also, in cases that functions of the aforementioned embodiments are realized not only by the computer executing the supplied program code, but also by the program code cooperating with an operating system or other application software and the like, the program code is included in the embodiments of the present invention.

Further, in the case in which the supplied program code is stored in memory equipped with a function expansion board within the computer or a function expansion unit connected to the computer, following which the CPU (central processing unit) or the like equipped with the function expansion board or the function expansion unit performs a part or all of actual processing based on the instructions from the program code, and the functions of the aforementioned embodiments are realized by the processing thereof, the program code is included in the present embodiments of the present invention.

Figure 14:
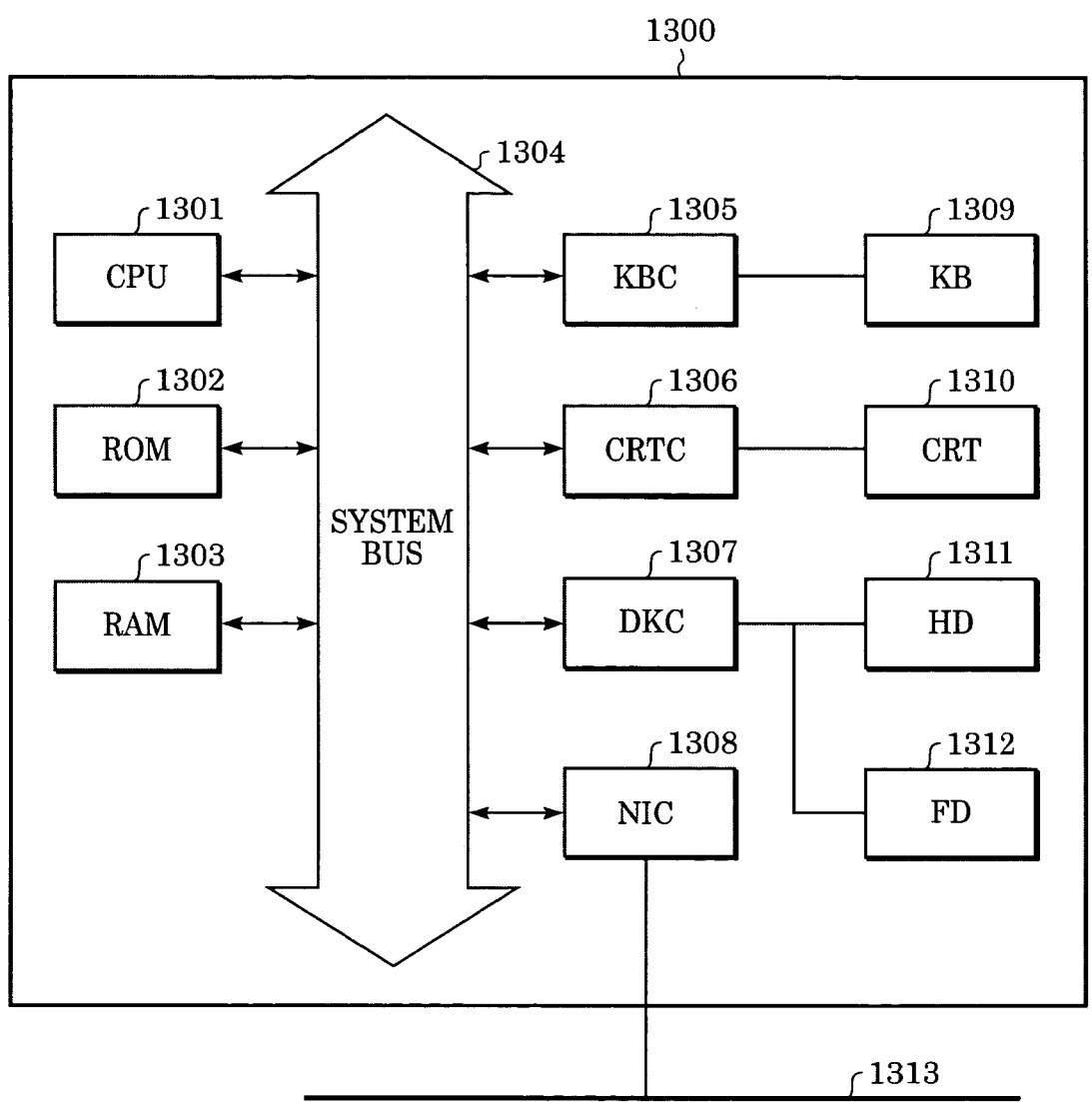
FIG. 14 is a block diagram illustrating the computer functions to be realized in the image processing device according to the second embodiment of the present invention.

For example, the image processing device according to the aforementioned embodiments includes computer functions 1300 such as shown in FIG. 14, and operation of the above-described embodiments are executed by a CPU 1301. With the computer functions 1300, as illustrated in FIG. 14, a CPU 1301, ROM 1302, RAM (random-access memory) 1303, a keyboard controller (KBC) 1305 of a keyboard (KB) 1309, a CRT controller (CRTC) 1306 of a CRT display (CRT) 1310 serving as a display unit, a disk controller (DKC) 1307 of a hard disk (HD) 1311 and a flexible disk (FD) 1312, and a network interface card (NIC) 1308 are mutually connected via a system bus 1304 so as to communicate with each other.

The CPU 1301 integrally controls each component unit connected to the system bus 1304 by executing software stored in the ROM 1302 or the HD 1311, or software supplied from the FD 1312. That is to say, the CPU 1301 performs control for realizing operation of the above-described embodiments by reading a processing program for performing operation as described above from the ROM 1302, HD 1311, or FD 1312 and executing the program.

The RAM 1303 functions as main memory of the CPU 1301, a work area, or the like. The KBC 1305 controls instructions input from the KB 1309, a pointing device (not shown), and the like. The CRTC 1306 controls display of the CRT 1310. The DKC 1307 controls access with the HD 1311 and FD 1312 each storing a boot program, various applications, user files, a network management program, the aforementioned processing program according to the aforementioned embodiments, and the like. The NIC 1308 exchanges data with other devices over the network 1313 bi-directionally.

Note that the exemplary embodiments have been described only as a few specific examples of carrying out the present invention, and accordingly should be interpreted illustratively and not restrictively. That is to say, the present invention can be implemented in various forms without departing from the technical idea thereof or primary features.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application Nos. 2003-412337 filed Dec. 10, 2003 and 2004-298471 filed Oct. 13, 2004, which are hereby incorporated by reference herein.

What is claimed is:

1. An image processing method that is able to produce a print of an image, the image processing method comprising:

obtaining a magnification factor for the print of the image, the image including a latent image region having dots of a first dot size and a background region having dots of a second dot size different than the first dot size, the background region of the image having substantially the same density as the latent image region of the image;

changing sizes of the latent image region and the background region according to the obtained magnification factor; and forming the latent image region and the background region, the sizes of which have been changed, by using dots of the first dot size and dots of the second dot size used to form the image with a magnification factor being one, respectively.

2. The image processing method according to claim 1, further comprising:

detecting dot sizes of dots in the copy image; and determining a latent image region and a background region in the image using the detected dot sizes of dots, the latent image region whose size is changed being the determined latent image region, and the background region whose size is changed being the determined background region.

3. An image processing apparatus that is able to produce a print of an image, the image processing apparatus comprising:

a magnification-factor unit configured to obtain a magnification factor for the print of the image, the image including a latent image region having dots of a first dot size and a background region having dots of a second dot size different than the first dot size, the background region of the image having substantially the same density as the latent image region of the image;

a size changing unit configured to change sizes of the latent image region and the background region according to the obtained magnification factor; and a dot forming unit configured to form the latent image region and the background region, the sizes of which have been changed, by using dots of the first dot size and dots of the second dot size used to form the image with the magnification factor being one, respectively.

4. The image processing apparatus according to claim 3, further comprising:

a detecting unit configured to detect dot sizes of dots in the image; and a determining unit configured to determine a latent image region and a background region in the image using the detected dot sizes of dots, the latent image region whose size is changed by the size changing unit being the determined latent image region, and the background region whose size is changed by the size changing unit being the determined background region.

5. A program for causing a computer to execute an image processing method that is able to produce a print of an image, the program comprising:

computer-executable instructions for obtaining a magnification factor for the print of the image, the image including a latent image region having dots of a first dot size and a background region having dots of a second dot size different than the first dot size, the background region of the image having substantially the same density as the latent image region of the image;

computer-executable instructions for changing sizes of the latent image region and the background region according to the magnification factor; and computer-executable instructions for forming the latent image region and the background region, the sizes of which have been changed, by using dots of the first dot size and dots of the second dot size used to form the image with the magnification factor being one, respectively.

6. The program according to claim 5, further comprising:
computer-executable instructions for detecting dot sizes of dots in the image; and
computer-executable instructions for determining a latent image region and a background region in the image using the detected dot sizes of dots;
wherein the latent image region whose size is changed is the determined latent image region, and the background region whose size is changed is the determined background region.

7. A computer-readable recording medium having recorded thereon a program for causing a computer to execute an image processing method that is able to produce a print of an image, the program comprising:
computer-executable instructions for obtaining a magnification factor for the print of the image, the image including a latent image region having dots of a first dot size and a background region having dots of a second dot size different than the first dot size, the background region of the image having substantially the same density as the latent image region of the image;
computer-executable instructions for changing sizes of the latent image region and the background region according to the magnification factor; and
computer-executable instructions for forming the latent image region and the background region, the sizes of which have been changed, by using dots of the first dot size and dots of the second dot size used to form the image with the magnification factor being one, respectively.

8. The computer-readable recording medium according to claim 7, wherein the program further comprises:
computer-executable instructions for detecting dot sizes of dots in the image; and
computer-executable instructions for determining a latent image region and a background region in the image using the detected dot sizes of dots;
wherein the latent image region whose size is changed is the determined latent image region, and the background region whose size is changed is the determined background region.

9. The image processing method according to claim 1 wherein the print of the image comprises a copy of the image.

10. The image processing apparatus according to claim 3 wherein the print of the image comprises a copy of the image.

11. The computer-readable recording medium according to claim 7 wherein the print of the image comprises a copy of the image.

* * * * *